United States Patent
Wu

(10) Patent No.: US 11,226,548 B2
(45) Date of Patent: Jan. 18, 2022

(54) POLARIZING PRESERVING FRONT PROJECTION SCREEN WITH PROTRUSIONS

(71) Applicant: RealD Inc., Beverly Hills, CA (US)

(72) Inventor: Ching-Chin Wu, Taipei (TW)

(73) Assignee: RealD, Beverly Hills, CA (US)

( * ) Notice: Subject to any disclaimer, the term of this patent is extended or adjusted under 35 U.S.C. 154(b) by 0 days.

(21) Appl. No.: 16/878,004

(22) Filed: May 19, 2020

(65) Prior Publication Data

US 2020/0387062 A1 Dec. 10, 2020

Related U.S. Application Data

(60) Provisional application No. 62/850,411, filed on May 20, 2019.

(51) Int. Cl.
| | |
|---|---|
| G03B 21/604 | (2014.01) |
| G03B 21/602 | (2014.01) |
| G03B 21/625 | (2014.01) |
| G03B 21/56 | (2006.01) |
| G03B 21/60 | (2014.01) |
| G03B 21/00 | (2006.01) |

(52) U.S. Cl.
CPC ........... *G03B 21/604* (2013.01); *G03B 21/56* (2013.01); *G03B 21/60* (2013.01); *G03B 21/602* (2013.01); *G03B 21/625* (2013.01); *G03B 21/003* (2013.01)

(58) Field of Classification Search
CPC ...... G03B 21/60; G03B 21/602; G03B 21/56; G03B 21/625; G03B 21/604
USPC ........................................................ 359/459
See application file for complete search history.

(56) References Cited

U.S. PATENT DOCUMENTS

| | | | | |
|---|---|---|---|---|
| 2,524,286 | A * | 10/1950 | Dreyer ................. | G02B 5/3033 359/487.02 |
| 6,299,981 | B1 * | 10/2001 | Azzopardi ............. | C03C 15/00 428/429 |
| 6,437,920 | B1 * | 8/2002 | Wohlstadter ........... | G02B 30/27 359/626 |
| 6,451,432 | B1 * | 9/2002 | Azzopardi .............. | C09D 4/00 428/429 |

(Continued)

FOREIGN PATENT DOCUMENTS

| | | | |
|---|---|---|---|
| WO | 0104701 A1 | 1/2001 | |
| WO | WO-0104701 A1 * | 1/2001 | ............. G03B 21/62 |

OTHER PUBLICATIONS

Pierre Negri et al., Removal of Surface Contamination and Self-Assembled Monolayers (SAMs) from Silver (Ag) Nanorod Substrates by Plasma Cleaning with Argon, Society of Applied Spectroscopy, vol. 65, No. 1, 2011, 9 pages (Year: 2011).*

(Continued)

*Primary Examiner* — Clayton E. LaBalle
*Assistant Examiner* — Kevin C Butler
(74) *Attorney, Agent, or Firm* — Penny L. Lowry

(57) ABSTRACT

A projection screen for diffusing illumination light into a range of viewing angles is formed by depositing a coating on a substrate. Within the coating are particles having an average particle height. Protrusions at least two microns higher than the average particle height may be substantially uniformly distributed over the screen. In some embodiments, each protrusion may be no closer than 80 microns to another protrusion.

20 Claims, 10 Drawing Sheets

(56) References Cited

U.S. PATENT DOCUMENTS

| | | | |
|---|---|---|---|
| 6,660,326 B2* | 12/2003 | Sano | B05D 1/00 156/230 |
| 7,068,427 B2* | 6/2006 | Hopkins | G03B 21/56 359/443 |
| 7,160,583 B2* | 1/2007 | Frey | C23C 18/1603 257/E21.174 |
| 7,621,648 B2* | 11/2009 | Wuillaume | G02B 5/08 359/883 |
| 7,898,734 B2 | 3/2011 | Coleman et al. | |
| 8,169,699 B2* | 5/2012 | Petersen | G03B 21/604 359/452 |
| 8,194,315 B2* | 6/2012 | Sharp | B29D 11/0074 359/452 |
| 8,434,871 B2* | 5/2013 | Bartol | G02B 30/35 353/7 |
| 8,488,240 B2* | 7/2013 | Petersen | G03B 21/56 359/452 |
| 8,526,106 B2* | 9/2013 | Coleman | G03B 21/604 359/443 |
| 8,760,760 B2* | 6/2014 | Coleman | G03B 21/604 359/459 |
| 8,926,441 B2* | 1/2015 | Fox | G03B 21/60 472/75 |
| 8,944,609 B2* | 2/2015 | Fox | G03B 21/62 353/79 |
| 9,529,207 B2* | 12/2016 | McKnight | G02B 27/48 |
| 9,696,617 B2* | 7/2017 | DiLullo | G03B 21/562 |
| 9,709,883 B2* | 7/2017 | Sharp | G02B 27/48 |
| 9,764,246 B2* | 9/2017 | Fox | E04H 3/22 |
| 10,440,455 B2* | 10/2019 | Fox | G10K 11/17861 |
| 2002/0160522 A1* | 10/2002 | Rubinstein | B82Y 30/00 436/164 |
| 2002/0168511 A1* | 11/2002 | Schneider | C09K 19/60 428/333 |
| 2004/0001943 A1* | 1/2004 | Alford | B01J 29/06 428/312.6 |
| 2004/0043146 A1* | 3/2004 | Pellerite | C08L 2666/28 427/207.1 |
| 2004/0224303 A1* | 11/2004 | Spencer | B82Y 30/00 435/4 |
| 2004/0257650 A1* | 12/2004 | Parusel | G03B 21/62 359/453 |
| 2005/0041311 A1* | 2/2005 | Mi | G02B 6/0053 359/831 |
| 2006/0008678 A1* | 1/2006 | Fukushima | B82Y 40/00 428/704 |
| 2006/0172082 A1* | 8/2006 | Masuda | B05D 1/185 427/532 |
| 2006/0263033 A1* | 11/2006 | Lahann | B29C 59/16 385/147 |
| 2007/0134420 A1* | 6/2007 | Koberstein | B05D 1/185 427/258 |
| 2007/0262027 A1* | 11/2007 | Krogue | C02F 1/288 210/688 |
| 2008/0219028 A1* | 9/2008 | Brewer | G02B 5/045 362/627 |
| 2008/0265387 A1* | 10/2008 | D'Urso | B05D 5/083 257/678 |
| 2008/0299288 A1* | 12/2008 | Kobrin | H01L 23/564 427/2.1 |
| 2009/0011222 A1* | 1/2009 | Xiu | C23C 18/00 428/323 |
| 2009/0190210 A1* | 7/2009 | Coleman | G02B 30/25 359/452 |
| 2009/0275826 A1* | 11/2009 | Enzerink | G02B 5/126 600/424 |
| 2010/0027144 A1* | 2/2010 | Varaprasad | G02B 1/14 359/870 |
| 2010/0307552 A1* | 12/2010 | Kohnke | H01L 31/02168 136/243 |
| 2012/0088066 A1* | 4/2012 | Aytug | C03C 17/34 428/141 |
| 2014/0247428 A1* | 9/2014 | Liu | G03B 21/604 353/8 |

OTHER PUBLICATIONS

J. Christopher Love et al, Self-Assembled Monolayers of Thiolates on Metals as a Form of Nanotechnology, Chem. Rev 2005, 105, 1103-1169 (Year: 2005).*

Johnathan Erland, Front Projection: Tessellating the Screen SMPTE Journal, Mar. 1986 Issue, vol. 95, No. 3, 10 pages (Year: 1986).*

PCT/US2020/033795 International Search Report and Written Opinion of the International Searching Authority dated Aug. 26, 2020.

* cited by examiner

POLARIZING PRESERVING FRONT PROJECTION SCREEN WITH PROTRUSIONS

TECHNICAL FIELD

This disclosure relates to polarization preserving front projection screens, and more particularly relates to durability, stain resistance, and off-axis image brightness of polarization preserving front projection screens.

BACKGROUND

Modern three-dimensional ("3D") cinema systems increasingly rely on polarization as a means of delivering stereoscopic imagery to an audience. Many of these systems place polarization control elements at both the digital projector and the viewer, which in practice makes the screen a contrast and/or cross-talk determining component. In recent years, screens available from RealD Inc. have provided improved light control for enhanced brightness, uniformity, and contrast for 3D cinema systems. Some examples of polarization preserving front projection screens include those taught by commonly-owned U.S. Pat. No. 7,898,734, commonly-owned U.S. Pat. No. 8,169,699, commonly-owned U.S. Pat. No. 8,194,315, and commonly-owned U.S. Pat. No. 8,760,760, all of which are herein incorporated by reference in their entireties.

Such polarization preserving front projection screens may include an engineered surface comprised of engineered particles deposited on a substrate that diffuses illumination light into a range of viewing angles while preserving polarization for 3D applications.

SUMMARY

Disclosed herein is a projection screen for diffusing illumination light into a range of viewing angles. The projection screen comprises a substrate and a plurality of particles deposited on a surface of the substrate to form a coating. The particles in the coating have an average particle height as measured from the surface of the substrate. Distributed among the particles are a plurality of protrusions. Each protrusion has a height as measured from the surface of the substrate that is at least two microns higher than the average particle height. In some embodiments, the protrusion height is at least three microns higher than the average particle height. In some embodiments, the protrusion height is at least four microns higher than the average particle height.

In some embodiments, the particles in the coating have an average surface slope angle, and each protrusion has a surface slope angle at least 10 degrees larger than the average surface slope angle. In some embodiments, each protrusion has a surface slope angle at least 20 degrees larger than the average surface slope angle.

In some embodiments, the protrusions are substantially uniformly distributed among the particles, and the projection screen may have a substantially uniform appearance. In some embodiments, each protrusion is no closer than 80 microns to another protrusion.

Also disclosed herein is a projection system comprising the projection screen as disclosed herein, and a light projector directing light toward the coating on the screen.

DETAILED DESCRIPTION

Figure 1A:
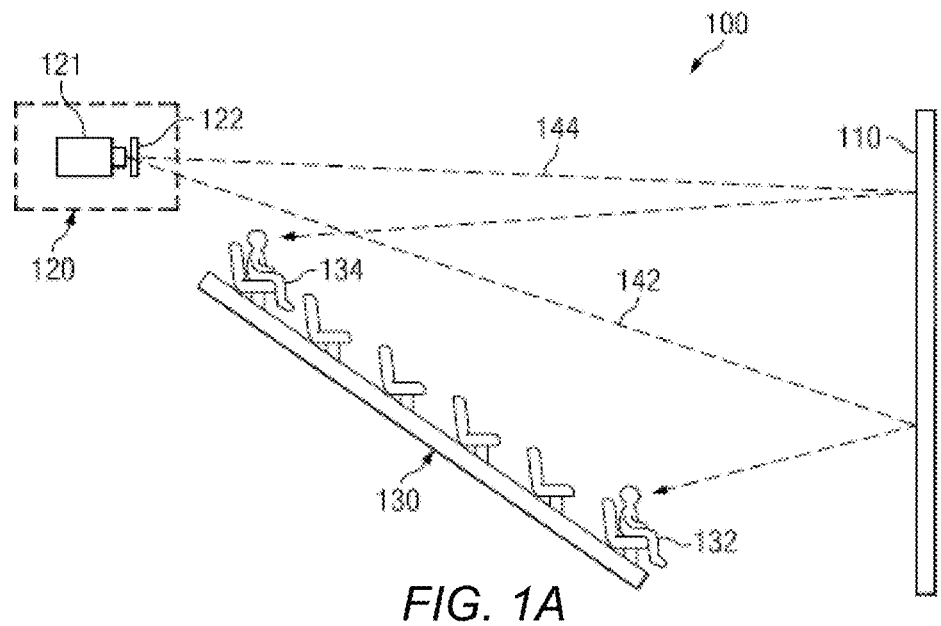
FIG. 1A is a schematic diagram illustrating a side view of a typical movie theater.
Figure 1B:
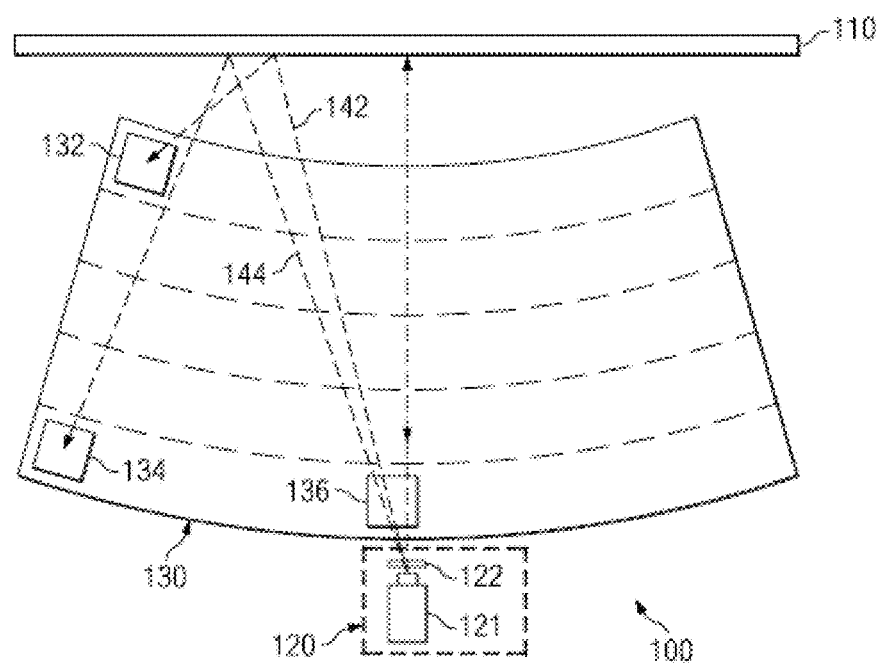
FIG. 1B is a schematic diagram illustrating a top-down view of a typical movie theater.

FIG. 1A is a schematic diagram illustrating a side view of a typical movie theater 100 and FIG. 1B is a schematic diagram showing a top-down view of movie theater 100. Movie theater 100 may include a reflective screen 110, a projector platform 120, and a viewing area 130. Projector platform 120 may include projector 121 and polarization switch 122. Viewing area 130 may provide seats organized in rows away from the screen, defining a viewing area for viewers that may sit (or stand) in different places within the viewing area 130. For example, a first viewer may be located at the front-left viewing position 132 of the movie theater 100, and receive reflected light 142. A second viewer may be located at the rear-left viewing position 134 and receive reflected light 144. A third viewer may be located in a central viewing position 136.

While the gain of the screen may be high from a centered viewing position (i.e., peak gain), the overall perceived image brightness may be impacted due to rapid fall-off with viewing angle, and there is typically a trade-off between gain and off-axis brightness. It may be difficult to keep gain high while providing enough light for off-axis viewing, which can be especially critical for short-throw cinema. In addition, it may be difficult to provide visual uniformity, especially near the corners of the screen.

Viewers in a theater with a long throw ratio may be far away from the screen, which lessens the immersive experience due to lack of coverage of the viewing angle. But moving viewers closer to the screen may result in lower brightness from the corners of the screen. To mitigate this problem, a screen with a lower gain may be used in short-throw theaters; however, as the gain value is decreased, more light may be scattered and brightness and contrast ratio may be reduced.

Embodiments of the screens disclosed herein may provide for increased corner brightness and/or greater off-axis gain relative to peak gain. In addition, disclosed embodiments may provide for greater screen durability such as resistance to scratching and/or other types of screen damage. Furthermore, disclosed embodiments may minimize the visibility of screen pollutants such as fingerprint stains and/or other types of contamination. Such screens can improve 3D as well as two-dimensional (2D) cinema viewing experiences.

High performance cinema screens, for example those created by depositing a coating of engineered particles onto a substrate, are available from RealD, Inc. Such screens diffuse illumination light into a range of viewing angles while preserving polarization for 3D applications, and topographical variations in the coatings may produce different gain curves and contrast ratios. However, off-axis gain generally approaches zero as peak gain increases. Methods for creating such screens are disclosed, for example, in commonly-owned U.S. Pat. No. 8,169,699 and commonly-owned U.S. Pat. No. 8,194,315.

Figure 2:
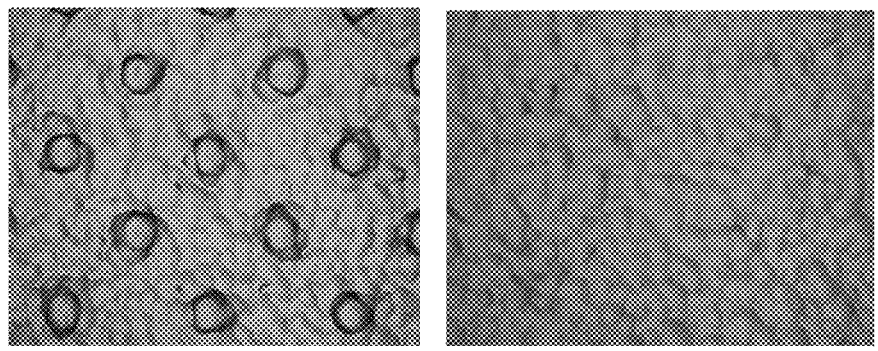
FIG. 2 illustrates magnified images of polarization preserving front projection screens with and without protrusions.

Some embodiments of the present disclosure include screen coating topographies with improved gain curves and contrast ratios. Introducing protrusions in the coating that are a few microns higher than the average particle height and that have higher slope angles may produce screens having higher gain and brighter corner performance, and off-axis gain can be stabilized. Such protrusions may be substantially uniformly distributed over the screen, and the screen may have a substantially homogenous appearance. Improvement may be observed when the protrusions are approximately two microns higher than average with surface slope angle approximately 10 degrees larger than average. Even more improvement may be observed when the protrusions are approximately three to four microns higher than average with surface slope angle approximately 20 degrees larger than average. Furthermore, the protrusions create a higher "landing zone" on the screen surface. Such a landing zone helps protect the screen from damage and contamination. Magnified images of such a screen with protrusions (left image) and of a screen without protrusions (right image) are illustrated in FIG. 2.

Figure 3:
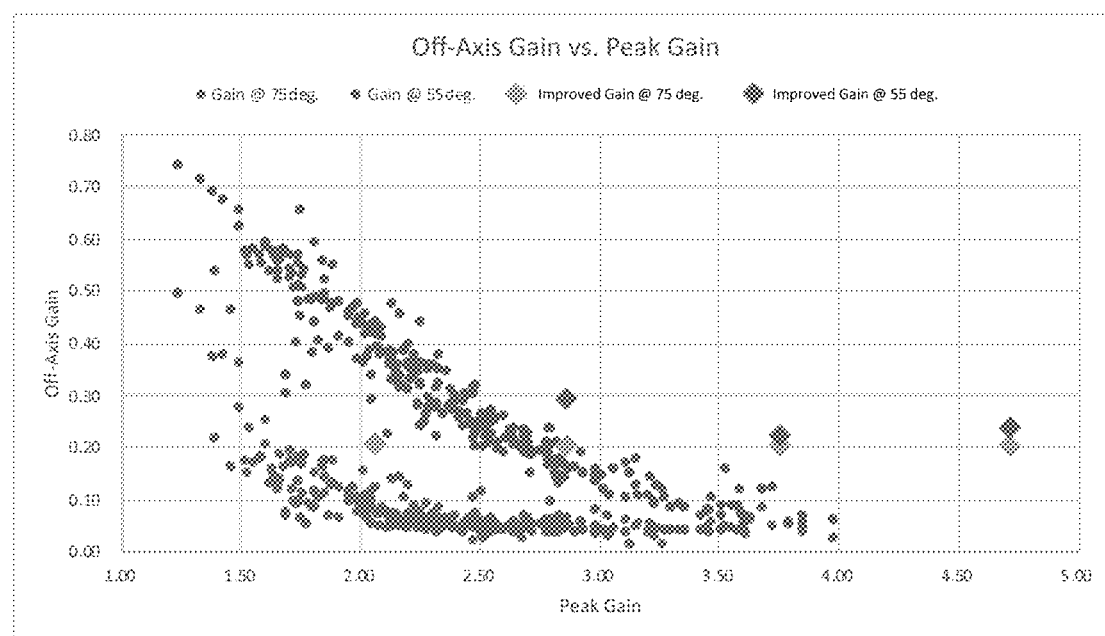
FIG. 3 is a graph plotting off-axis gain against peak gain for polarization preserving front projection screens.

FIG. 3 is a graph showing off-axis gain versus peak gain for a variety of known projection screens that do not have protrusions as described in this disclosure, as well as for four example projection screens that do have protrusions. For known screens (not having embodiments of the disclosed protrusions) with a peak gain ranging from approximately 1.2 through approximately 4.0, off-axis gain at 55 degrees is approximately 0.75 when peak gain is approximately 1.2, decreases to approximately 0.45 when peak gain is approximately 2.0, decreases further to approximately 0.25 when peak gain is approximately 2.5, decreases even further to approximately 0.15 when peak gain is approximately 3.0, decreases even further to approximately 0.10 when peak gain is approximately 3.5, and decreases even further to approximately 0.05 when peak gain is approximately 4.0. Off-axis gain at a 75 degree viewing angle shows even worse off-axis performance for these known screens. Off-axis gain at 75 degrees is approximately 0.5 when peak gain is approximately 1.2, decreases to approximately 0.10 when peak gain is approximately 2.0, and decreases further to approximately 0.05 when peak gain is only approximately 2.5. As this data shows, for screens without protrusion embodiments as disclosed herein, off-axis gain is reduced dramatically as peak gain increases.

In example screens having embodiments of the disclosed protrusions, off-axis gain at 55 degrees is 0.43 for a screen having a peak gain of 2.1, decreases to 0.29 for a screen having a peak gain of 2.86, decreases only slightly to 0.22 for a screen having a peak gain of 3.8, and holds at 0.24 for a screen having a peak gain of 4.7. Improvements are even more dramatic for larger viewing angles. Off-axis gain at 75 degrees is 0.21 for the screen having a peak gain of 2.1, holds at 0.20 for the screen having a peak gain of 2.86, continues to hold at 0.20 for the screen having a peak gain of 3.8, and continues to hold at 0.20 for the screen having a peak gain of 4.7. As this data shows, for screens having protrusion embodiments as disclosed herein, off-axis gain is much less reduced as peak gain increases, thus providing viewers with a brighter overall cinema experience while mitigating the dark-corner problem.

Figure 4:
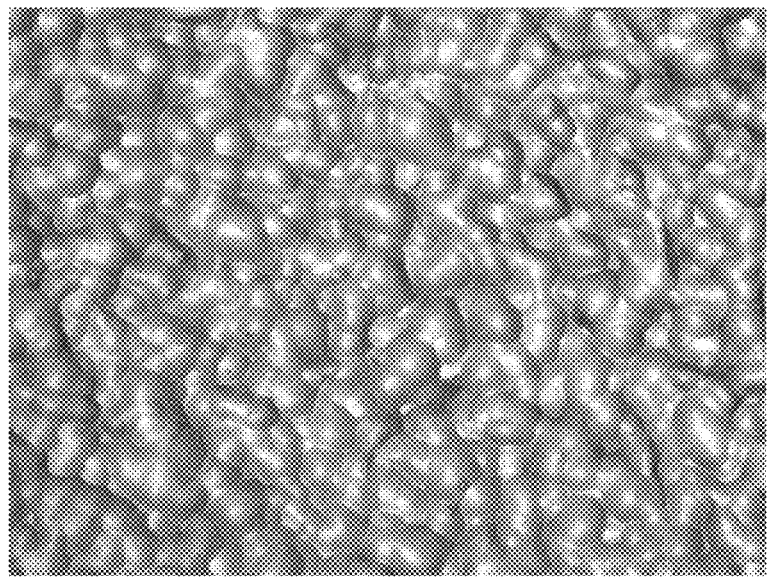
FIG. 4 illustrates a magnified image of a portion of a polarization preserving front projection screen without protrusions and an associated topographical height profile.
Figure 4:
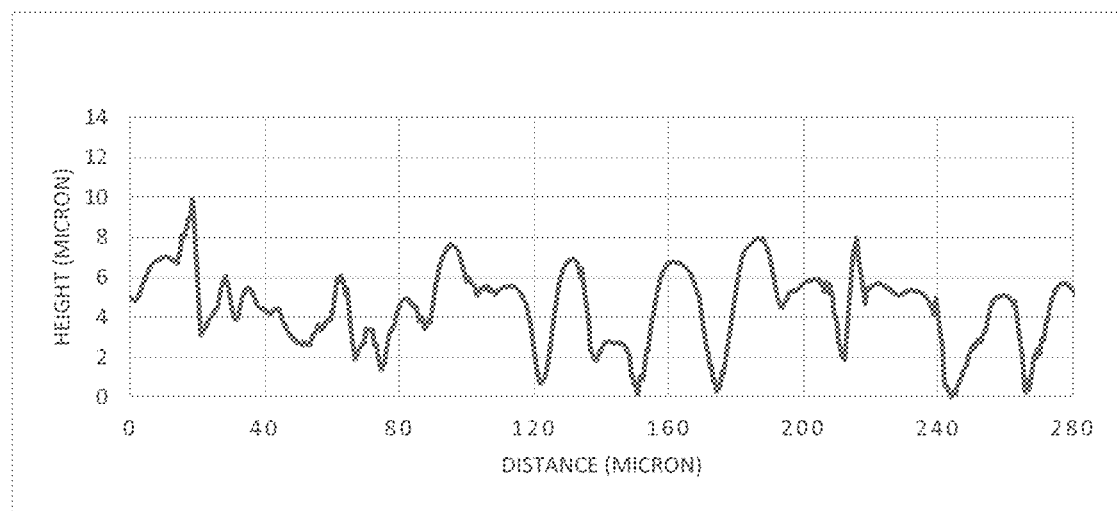

FIG. 4 presents a magnified image of a representative portion of a screen that does not have embodiments of the protrusion technology described herein, as well as a topographical height profile of a cross-section of a representative portion of that screen. The screen presented in FIG. 4 has a peak gain of 2.2, an off-axis gain of 0.45 at 55 degrees, and an off-axis gain of only 0.14 at 75 degrees. Also for the screen presented in FIG. 4, the half-gain angle is 38 and the stereo contrast ratio is 476. The mean roughness of the screen presented in FIG. 4 is 0.82 microns, and the mean roughness depth is 6.69 microns.

Figure 5:
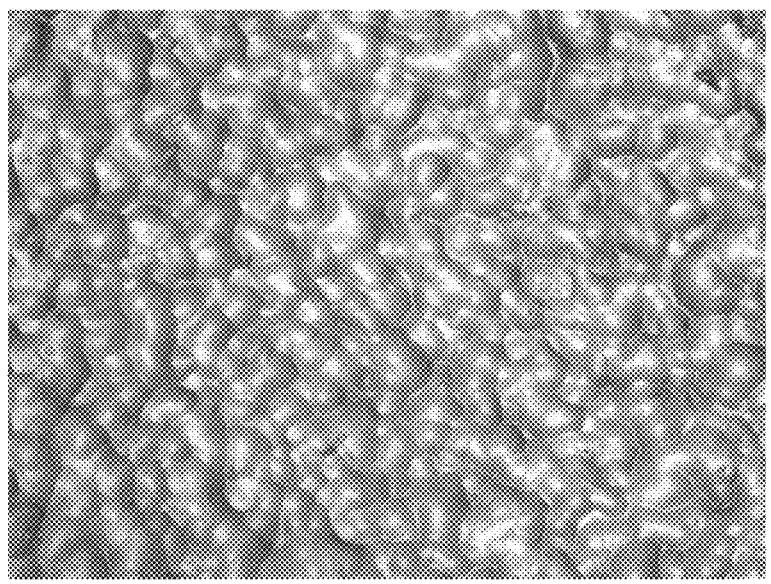
FIG. 5 illustrates a magnified image of a portion of a polarization preserving front projection screen without protrusions and an associated topographical height profile.
Figure 5:
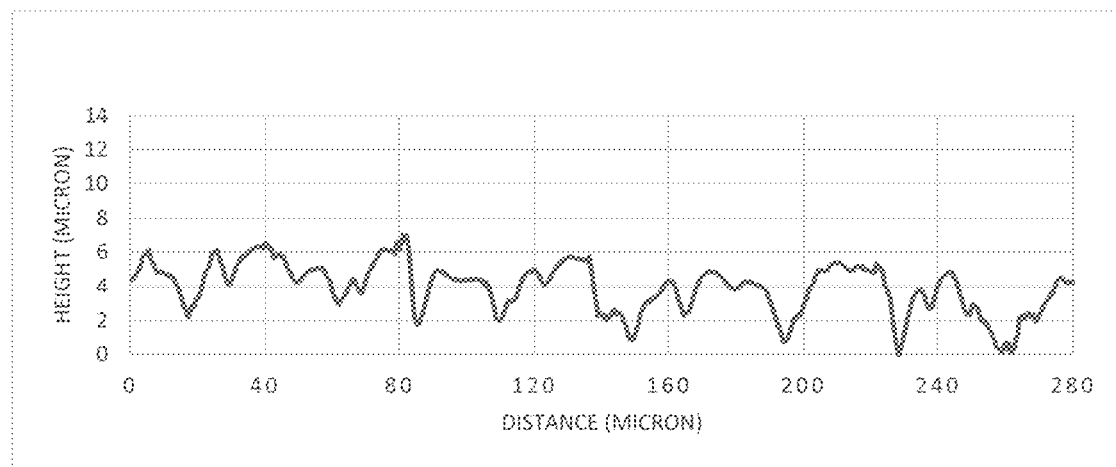

FIG. 5 presents a magnified image of a representative portion of another screen that does not have embodiments of the protrusion technology described herein, as well as a topographical height profile of a cross-section of a representative portion of that screen. The screen presented in FIG. 5 has a peak gain of 2.8, an off-axis gain of only 0.24 at 55 degrees, and an off-axis gain of only 0.09 at 75 degrees. Also for the screen presented in FIG. 5, the half-gain angle is 30 and the stereo contrast ratio is 758. The mean roughness of the screen presented in FIG. 5 is 0.64 microns, and the mean roughness depth is 5.41 microns.

Figure 6:
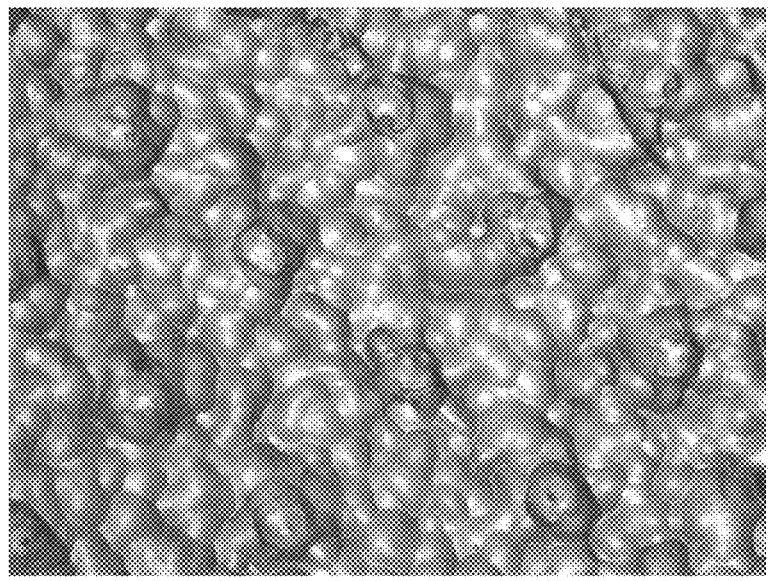
FIG. 6 illustrates a magnified image of a portion of a polarization preserving front projection screen having protrusions and an associated topographical height profile.
Figure 6:
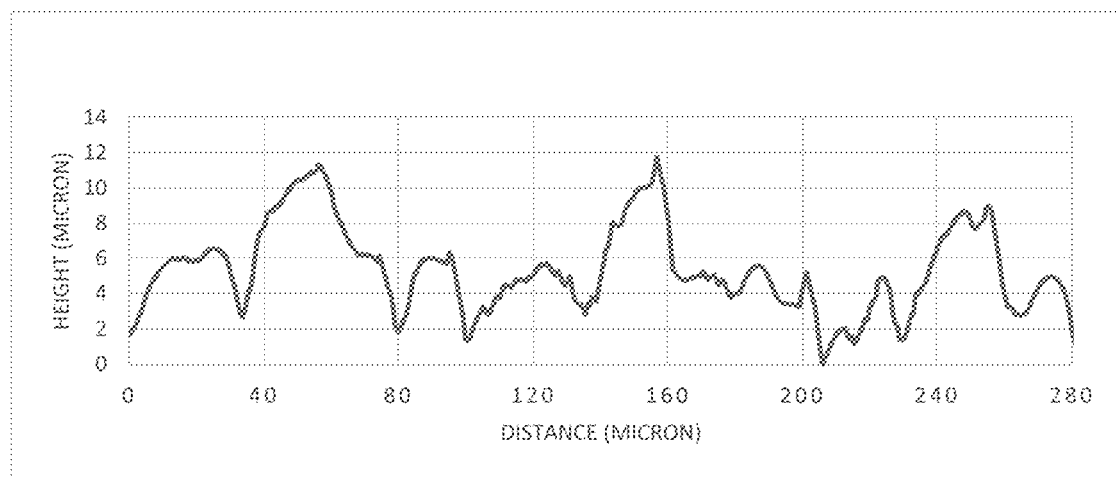

FIG. 6 presents a magnified image of a representative portion of an example screen that has embodiments of the protrusion technology described herein, as well as a topographical height profile of a cross-section of a representative portion of that screen. The screen presented in FIG. 6 has a peak gain of 2.1, an off-axis gain of 0.43 at 55 degrees, and an off-axis gain of 0.21 at 75 degrees. Also for the screen presented in FIG. 6, the half-gain angle is 38 and the stereo contrast ratio is 420. The mean roughness of the screen presented in FIG. 6 is 1.11 microns, and the mean roughness depth is 9.58 microns. Protrusions are clearly visible in the magnified image, and are represented at distances of approximately 55 microns, 158 microns, and 250 microns in the height profile.

Figure 7:
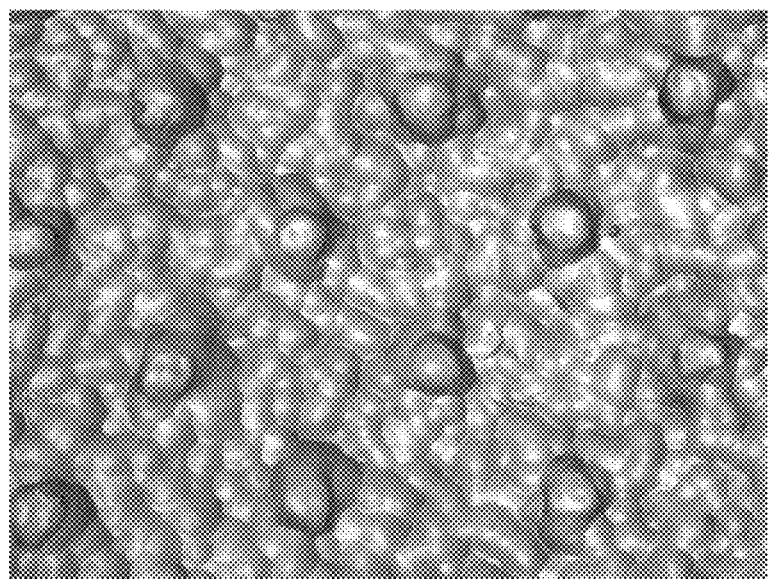
FIG. 7 illustrates a magnified image of a portion of a polarization preserving front projection screen having protrusions and an associated topographical height profile.
Figure 7:
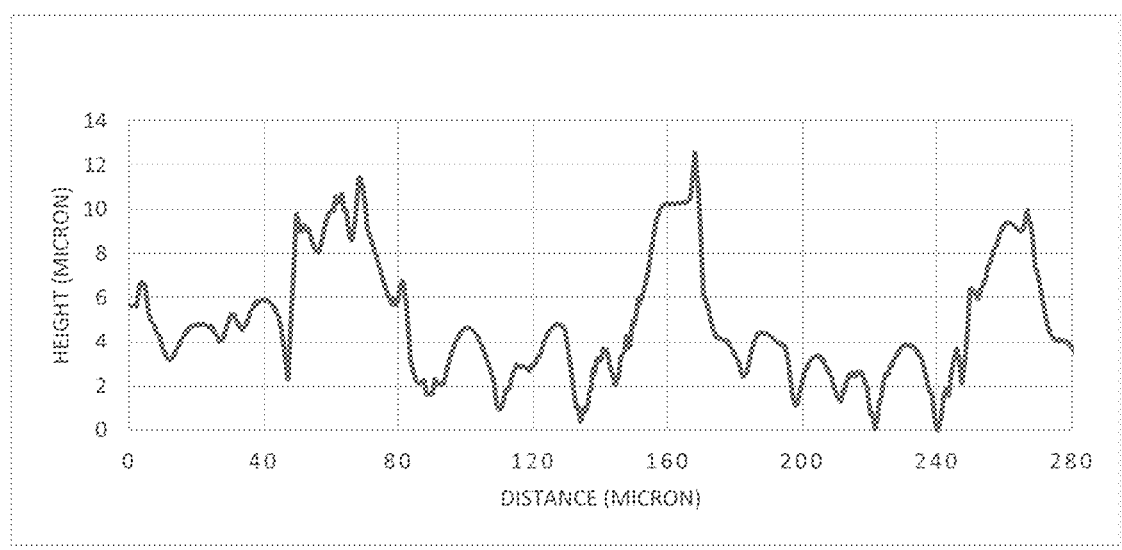

FIG. 7 presents a magnified image of a representative portion of another example screen that has embodiments of the protrusion technology described herein, as well as a topographical height profile of a cross-section of a representative portion of that screen. The screen presented in FIG. 7 has a peak gain of 2.86, an off-axis gain of 0.29 at 55 degrees, and an off-axis gain of 0.20 at 75 degrees. Also for the screen presented in FIG. 7, the half-gain angle is 31 and the stereo contrast ratio is 936. The mean roughness of the screen presented in FIG. 7 is 1.09 microns, and the mean roughness depth is 8.91 microns. Protrusions are clearly visible in the magnified image, and are represented at distances of approximately 60 microns, 165 microns, and 260 microns in the height profile.

Figure 8:
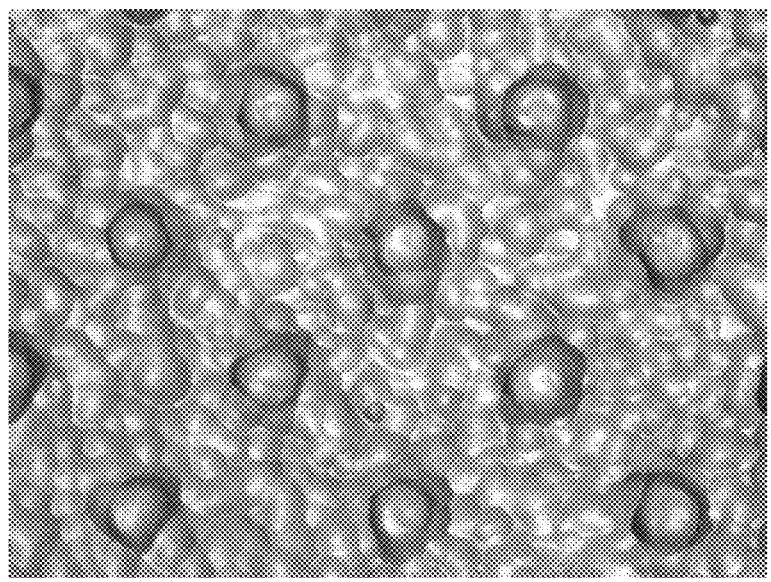
FIG. 8 illustrates a magnified image of a portion of a polarization preserving front projection screen having protrusions and an associated topographical height profile.
Figure 8:
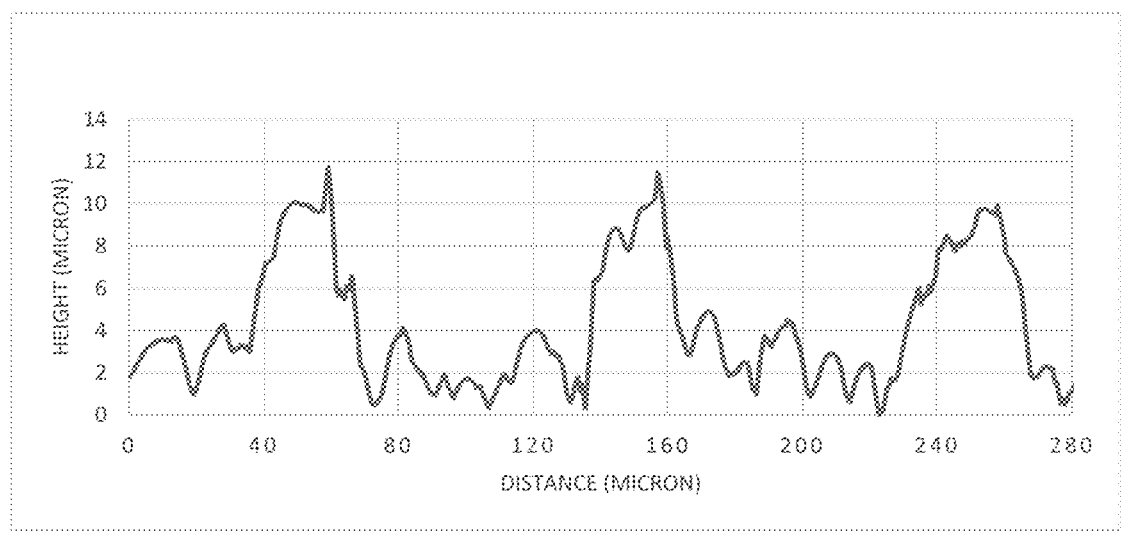

FIG. 8 presents a magnified image of a representative portion of yet another example screen that has embodiments of the protrusion technology described herein, as well as a topographical height profile of a cross-section of a representative portion of that screen. The screen presented in FIG.

8 has a peak gain of 3.8, an off-axis gain of 0.22 at 55 degrees, and an off-axis gain of 0.20 at 75 degrees. Also for the screen presented in FIG. 8, the half-gain angle is 25 and the stereo contrast ratio is 1024. The mean roughness of the screen presented in FIG. 8 is 1.11 microns, and the mean roughness depth is 8.62 microns. Protrusions are clearly visible in the magnified image, and are represented at distances of approximately 55 microns, 155 microns, and 250 microns in the height profile.

Figure 9:
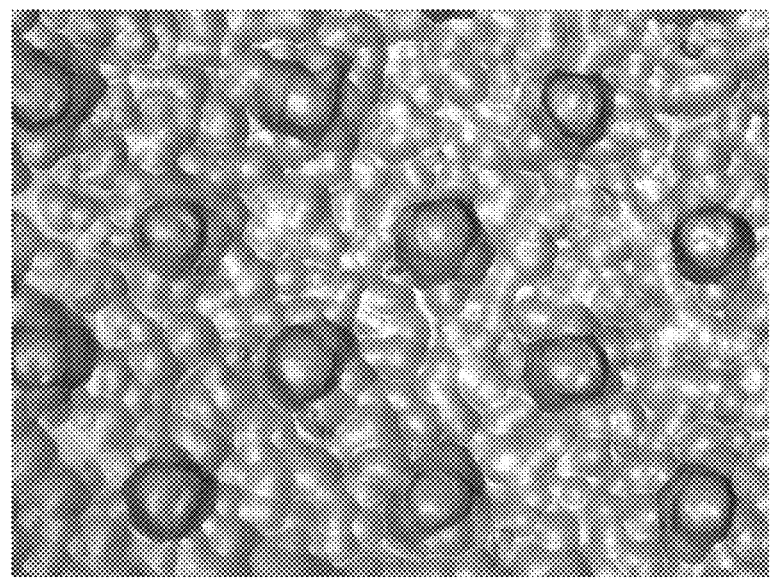
FIG. 9 illustrates a magnified image of a portion of a polarization preserving front projection screen having protrusions and an associated topographical height profile.
Figure 9:
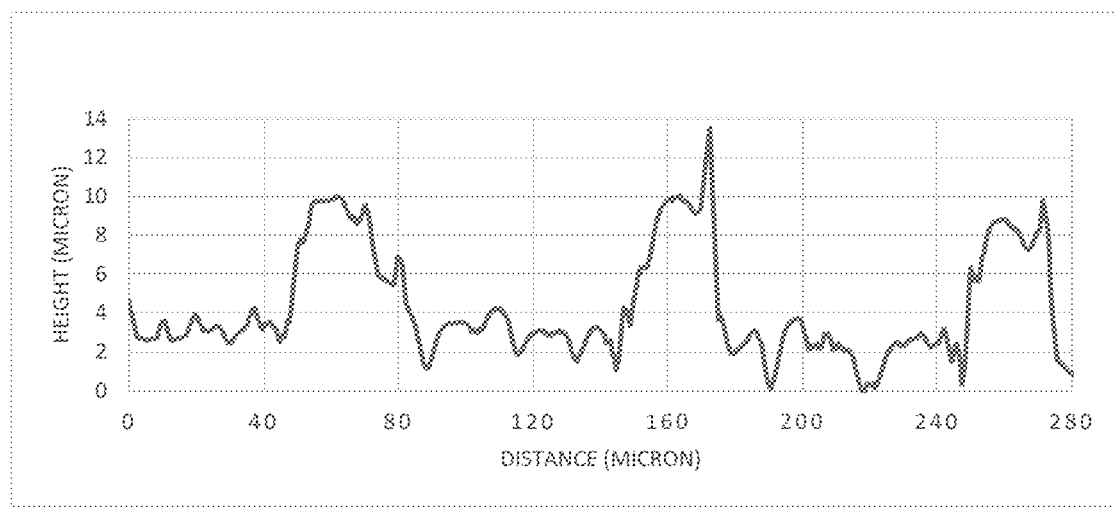

FIG. 9 presents a magnified image of a representative portion of yet another example screen that has embodiments of the protrusion technology described herein, as well as a topographical height profile of a cross-section of a representative portion of that screen. The screen presented in FIG. 9 has a peak gain of 4.7, an off-axis gain of 0.24 at 55 degrees, and an off-axis gain of 0.20 at 75 degrees. Also for the screen presented in FIG. 9, the half-gain angle is 22 and the stereo contrast ratio is 1055. The mean roughness of the screen presented in FIG. 9 is 1.06 microns, and the mean roughness depth is 8.27 microns. Protrusions are clearly visible in the magnified image, and are represented at distances of approximately 60 microns, 170 microns, and 260 microns in the height profile.

Screens having protrusions as described herein, examples of which are represented in FIG. 6, FIG. 7, FIG. 8, and FIG. 9, may provide a superior cinema viewing experience over screen not having such protrusions, examples of which are represented in FIG. 4 and FIG. 5, especially for the short throw auditoriums required for an immersive cinema experience. For example, viewers in central viewing positions may be less distracted by dark corners, while viewers in left and right viewing positions may also enjoy higher brightness overall.

Figure 10:
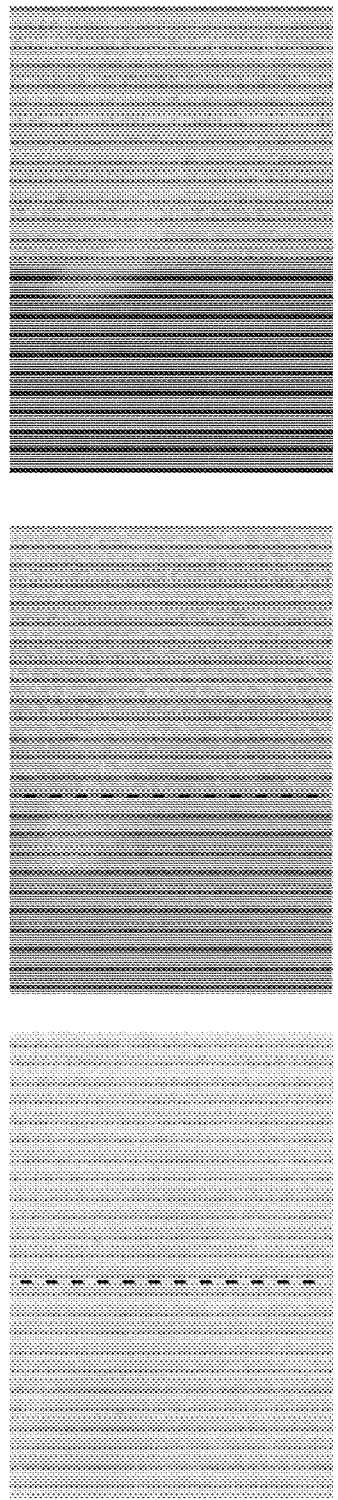
FIG. 10 illustrates three views of a divided polarization preserving front projection screen.

In addition, screens with protrusions as disclosed herein may provide for greater screen durability such as resistance to scratching and/or other types of screen damage. Furthermore, disclosed embodiments may minimize the visibility of screen pollutants such as fingerprint stains and/or other types of contamination. FIG. 10 illustrates three views of a divided screen having a peak gain of approximately 3.0. The divided screen has been contaminated with a fingerprint. To the left of the divide, the screen has no protrusions as described herein, while to the right of the divide, the screen has protrusions as described herein. The left-most view is a head-on view, and it is difficult to determine whether the fingerprint contamination has left a stain at all, since both sides appear equally bright. The center view is an off-axis view, and although overall brightness is diminished, the left side is much darker, and it is apparent that the fingerprint has left a stain on the left side of the divide; however, the protrusions have apparently protected the right side of the divide from staining. The right-most view is from the side of the screen approaching a 90 degree viewing angle. The left side is almost completely dark, and the fingerprint stain is clearly visible, while the right side remains uniformly bright, providing further evidence that the protrusions have protected the screen from contamination by the fingerprint.

Figure 11:
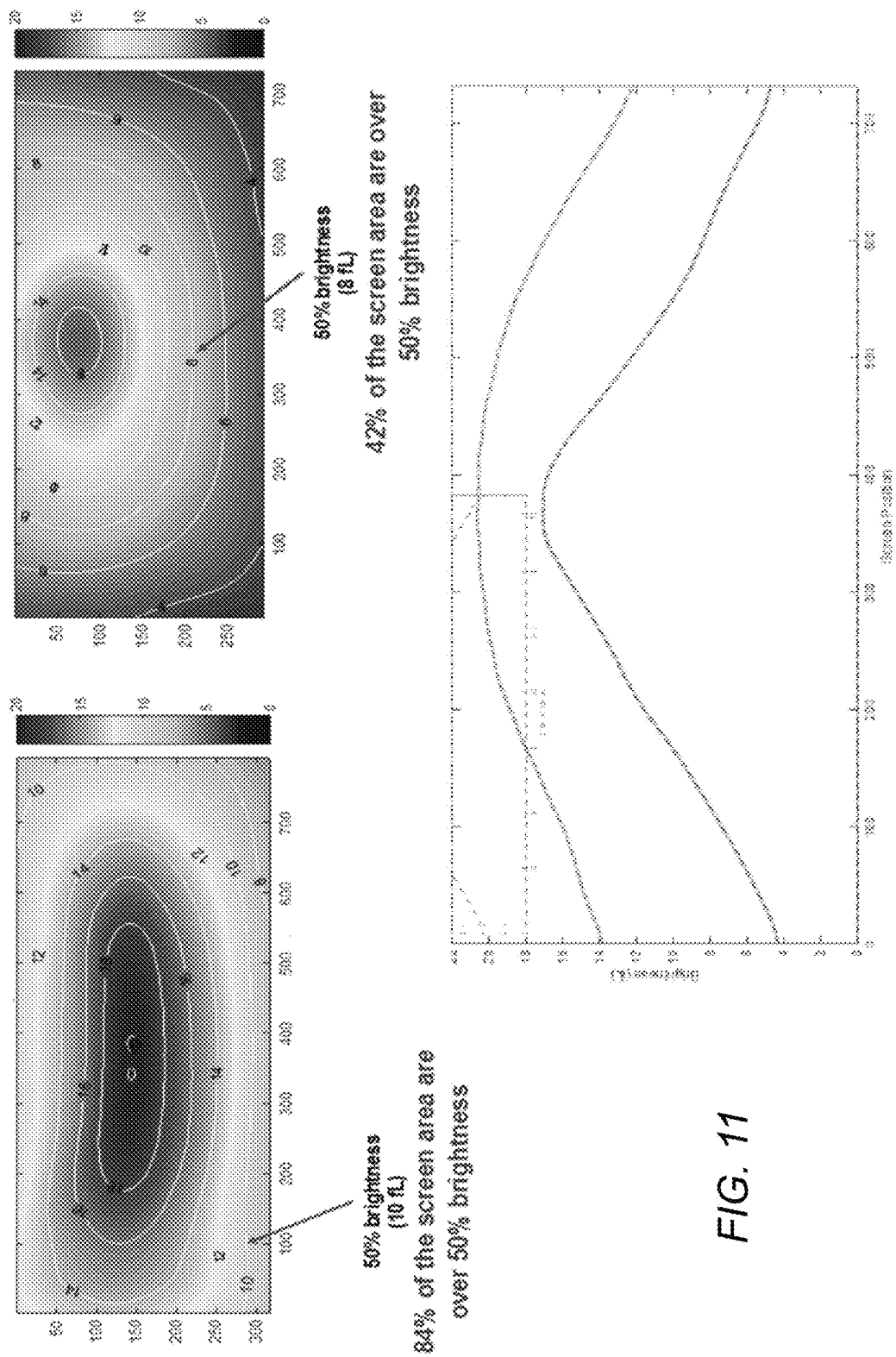
FIG. 11 illustrates brightness graphs for polarization preserving front projection screens.

FIG. 11 presents three brightness graphs contrasting performance of projection screens without embodiments of the disclosed protrusions with performance of projection screens that have embodiments of the disclosed protrusions. The top right graph contains data from an example screen not having embodiments of the disclosed protrusions. This screen exhibits peak brightness of 16.8 foot-Lamberts in the center of the screen. Radiating out from the center of the screen, brightness gradually decreases to a minimum brightness of 3.1 foot-Lamberts at the corners, for a uniformity score of 18%. Only 42% of the screen area is greater than 50% brightness (8 foot-Lamberts).

The top left graph contains data from an example screen having embodiments of the disclosed protrusions. This screen exhibits peak brightness of 20.6 foot-Lamberts in the center of the screen. Radiating out from the center of the screen, brightness gradually decreases to a minimum brightness of 6.3 foot-Lamberts in the lower right corner, for a uniformity score of 31%. 84% of the screen area is greater than 50% brightness (10 foot-Lamberts). This screen is 26% brighter and exhibits much more uniformity that the screen without protrusions.

This data is further illustrated in the lower graph, which plots brightness by screen position. The top line is from the screen having protrusions (top left) and the bottom line is from the screen without protrusions (top right).

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A front projection screen for diffusing illumination light into a range of viewing angles, the front projection screen comprising:
   a substrate;
   a plurality of particles deposited on a surface of the substrate to form a coating, the plurality of particles in the coating having an average particle height measured from the surface of the substrate; and
   a plurality of protrusions among the plurality of particles, each protrusion in the plurality of protrusions having a height measured from the surface of the substrate that is at least two microns higher than the average particle height, wherein the height of each protrusion exceeds the average particle height.

2. The front projection screen of claim 1, wherein each protrusion in the plurality of protrusions has a height measured from the surface of the substrate that is at least three microns higher than the average particle height.

3. The front projection screen of claim 1, wherein each protrusion in the plurality of protrusions has a height measured from the surface of the substrate that is at least four microns higher than the average particle height.

4. The front projection screen of claim 1, wherein the plurality of particles in the coating has an average surface slope angle, and wherein each protrusion in the plurality of protrusions has a surface slope angle that is at least 10 degrees larger than the average surface slope angle.

5. The front projection screen of claim 4, wherein each protrusion in the plurality of protrusions has a surface slope angle that is at least 15 degrees larger than the average surface slope angle.

6. The front projection screen of claim 4, wherein each protrusion in the plurality of protrusions has a surface slope angle that is at least 20 degrees larger than the average surface slope angle.

7. The front projection screen of claim 1, wherein the front projection screen has a peak gain of at least 2.0, and wherein the projection screen has an off-axis gain of at least 0.20 at 75 degrees.

8. The front projection screen of claim 1, wherein the front projection screen has a peak gain of at least 2.8, and wherein the projection screen has an off-axis gain of at least 0.20 at 55 degrees.

9. The front projection screen of claim 1, wherein the plurality of protrusions are substantially uniformly distributed among the plurality of particles.

10. The front projection screen of claim 1, wherein the front projection screen has a substantially uniform appearance.

11. The front projection screen of claim 1, wherein each protrusion in the plurality of protrusions has a highest peak, and wherein the highest peak of each protrusion is no closer than 80 microns to the highest peak of another protrusion.

12. The front projection screen of claim 1, wherein the front projection screen is adapted to reflect incident illumination light into the range of viewing angles and is further adapted to maintain a same state of polarization as the incident illumination light from a projector.

13. A projection system comprising:
a front projection screen comprising:
a substrate;
a plurality of protrusions formed on the substrate;
a plurality of particles deposited on the substrate to form a coating, the plurality of particles in the coating having an average particle height,
wherein each protrusion in the plurality of protrusions has a height that is at least two microns higher than the average particle height, wherein the height of the protrusions exceeds the average particle height; and
a light projector directing light toward the coating on the substrate.

14. A front projection screen comprising:
a substrate;
a plurality of protrusions formed on the substrate; and
a plurality of particles deposited on a surface of the substrate to form a coating, the plurality of particles in the coating having an average particle height measured from the surface of the substrate,
wherein each protrusion in the plurality of protrusions has a height measured from the surface of the substrate that is at least two microns higher than the average particle height, and
wherein the height of the protrusions exceeds the average particle height.

15. The front projection screen of claim 14, wherein the front projection screen is adapted to reflect incident illumination light from a projector into a range of viewing angles.

16. The front projection screen of claim 15, wherein the range of viewing angles are defined by a viewing area of a movie theater.

17. The front projection screen of claim 15, wherein the front projection screen is further adapted to preserve polarization states of the incident illumination light reflected to the range of viewing angles.

18. The front projection screen of claim 14, wherein the front projection screen has a substantially uniform appearance.

19. The front projection screen of claim 14, wherein the plurality of particles in the coating has an average surface slope angle, and wherein each protrusion in the plurality of protrusions has a surface slope angle that is at least 10 degrees larger than the average surface slope angle.

20. The front projection screen of claim 14, wherein each protrusion in the plurality of protrusions has a highest peak, and wherein the highest peak of each protrusion is no closer than 80 microns to the highest peak of another protrusion.

* * * * *